US010395141B2

(12) United States Patent
Bobovich et al.

(10) Patent No.: US 10,395,141 B2
(45) Date of Patent: Aug. 27, 2019

(54) WEIGHT INITIALIZATION FOR MACHINE LEARNING MODELS

(71) Applicant: SAP SE, Walldorf (DE)

(72) Inventors: Leonid Bobovich, Ra'anana (IL); Ilia Rutenburg, Ayanot (IL); Michael Kemelmakher, Hod Hasharon (IL); Ran Moshe Bittmann, Tel Aviv (IL)

(73) Assignee: SAP SE, Walldorf (DE)

( * ) Notice: Subject to any disclaimer, the term of this patent is extended or adjusted under 35 U.S.C. 154(b) by 183 days.

(21) Appl. No.: 15/463,651

(22) Filed: Mar. 20, 2017

(65) Prior Publication Data
US 2018/0268584 A1  Sep. 20, 2018

(51) Int. Cl.
G06K 9/46 (2006.01)
G06K 9/62 (2006.01)
(Continued)

(52) U.S. Cl.
CPC ....... *G06K 9/6267* (2013.01); *G06K 9/00362* (2013.01); *G06K 9/00979* (2013.01); *G06K 9/4628* (2013.01); *G06K 9/6256* (2013.01); *G06K 9/6262* (2013.01); *G06K 9/6272* (2013.01); *G06N 3/0454* (2013.01); *G06N 3/084* (2013.01); *G06T 3/40* (2013.01);
(Continued)

(58) Field of Classification Search
None
See application file for complete search history.

(56) References Cited

U.S. PATENT DOCUMENTS 7,890,443 B2    2/2011  Zhang et al.
8,051,019 B2   11/2011  Sigal et al.
(Continued)

FOREIGN PATENT DOCUMENTS

CN    104268524 A    1/2015

OTHER PUBLICATIONS

Simonyan, Karen, and Andrew Zisserman. "Very deep convolutional networks for large-scale image recognition." arXiv preprint arXiv:1409.1556 2014. (Year: 2014).*
(Continued)

*Primary Examiner* — Kim Y Vu
*Assistant Examiner* — Nathan J Bloom
(74) *Attorney, Agent, or Firm* — Mintz Levin Cohn Ferris Glovsky and Popeo, P.C.

(57) ABSTRACT

In one respect, there is provided a system that may include a processor and a memory. The memory may be configured to store instructions that results in operations when executed by the processor. The operations may include: processing an image set with a convolutional neural network configured to detect, in the image set, a first feature and a second feature; determining a respective effectiveness of the first feature and the second feature in enabling the convolutional neural network to classify images in the image set; determining, based at least on the respective effectiveness of the first feature and the second feature, a first initial weight for the first feature and a second initial weight for the second feature; and initializing the convolutional neural network for training, the initialization of the convolutional neural network comprising configuring the convolutional neural network to apply the first initial weight and the second initial weight.

18 Claims, 8 Drawing Sheets

(51) Int. Cl.
*G06N 3/04* (2006.01)
*G06N 3/08* (2006.01)
*G06T 3/40* (2006.01)
*G06T 7/73* (2017.01)
*G06T 11/00* (2006.01)
*G06K 9/00* (2006.01)

(52) U.S. Cl.
CPC ............... *G06T 7/73* (2017.01); *G06T 11/00* (2013.01); *G06T 2210/22* (2013.01)

(56) References Cited

U.S. PATENT DOCUMENTS

| | | |
|---|---|---|
| 9,449,344 B2 | 9/2016 | Deshpande et al. |
| 9,977,997 B2 | 5/2018 | Bai et al. |
| 2016/0259994 A1* | 9/2016 | Ravindran ............... G06K 9/00 |
| 2017/0132515 A1* | 5/2017 | Yokoi ................... G06N 3/084 |
| 2017/0372174 A1* | 12/2017 | Wshah ................. G06K 9/6256 |
| 2018/0060652 A1* | 3/2018 | Zhang ................. G06K 9/6298 |
| 2018/0121805 A1* | 5/2018 | Stone ................... G06K 9/4628 |
| 2018/0144209 A1* | 5/2018 | Kim ........................ G16H 50/20 |
| 2018/0144466 A1* | 5/2018 | Hsieh ........................ G06N 3/04 |
| 2018/0189613 A1* | 7/2018 | Wolf ........................ G06K 9/46 |

OTHER PUBLICATIONS

Jia, Yangqing, et al. "Caffe: Convolutional architecture for fast feature embedding." Proceedings of the 22nd ACM international conference on Multimedia. ACM, 2014. (Year: 2014).*
Provisional Document U.S. Appl. No. 62/381,757 of the relied upon Zhang et al (US 2018/0060652) reference, Priority Date Aug. 31, 2016 (Year: 2016).*

\* cited by examiner

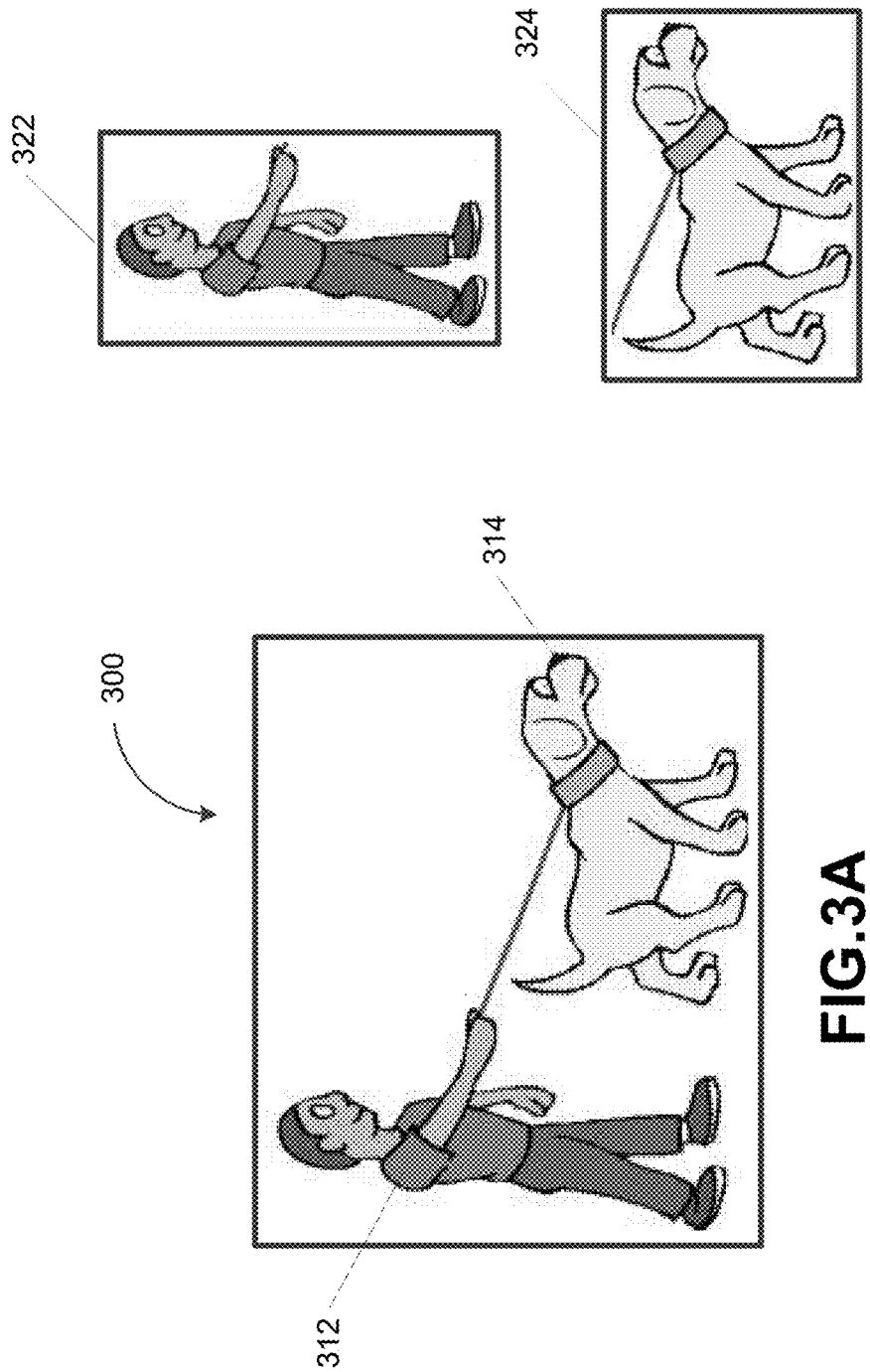

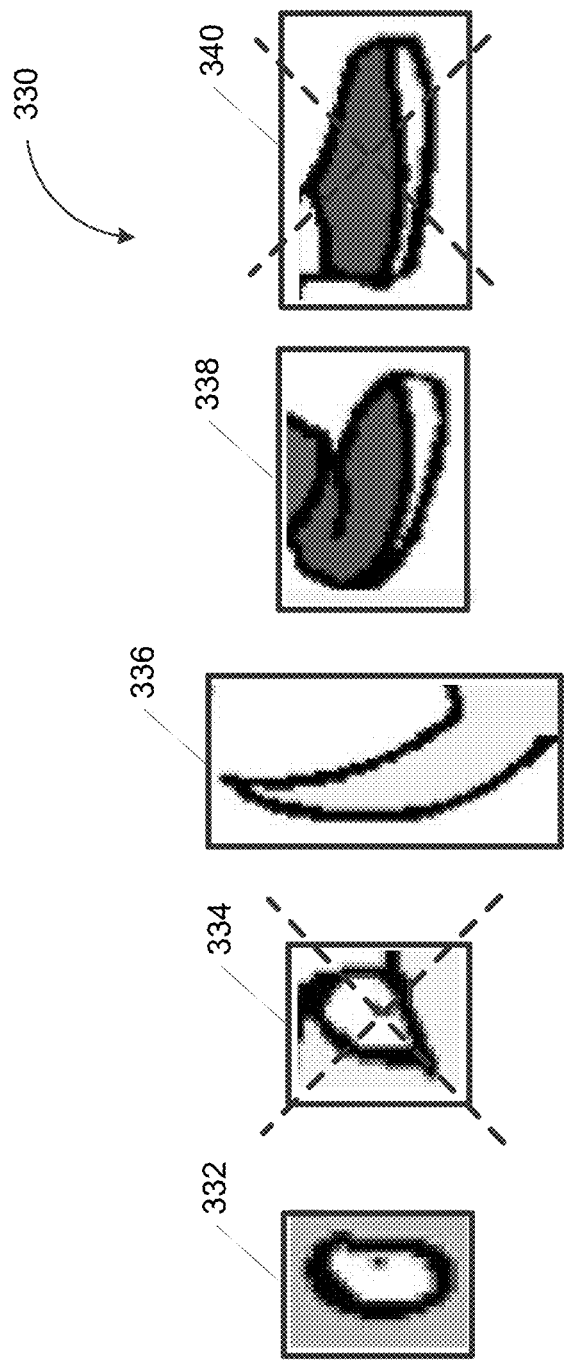

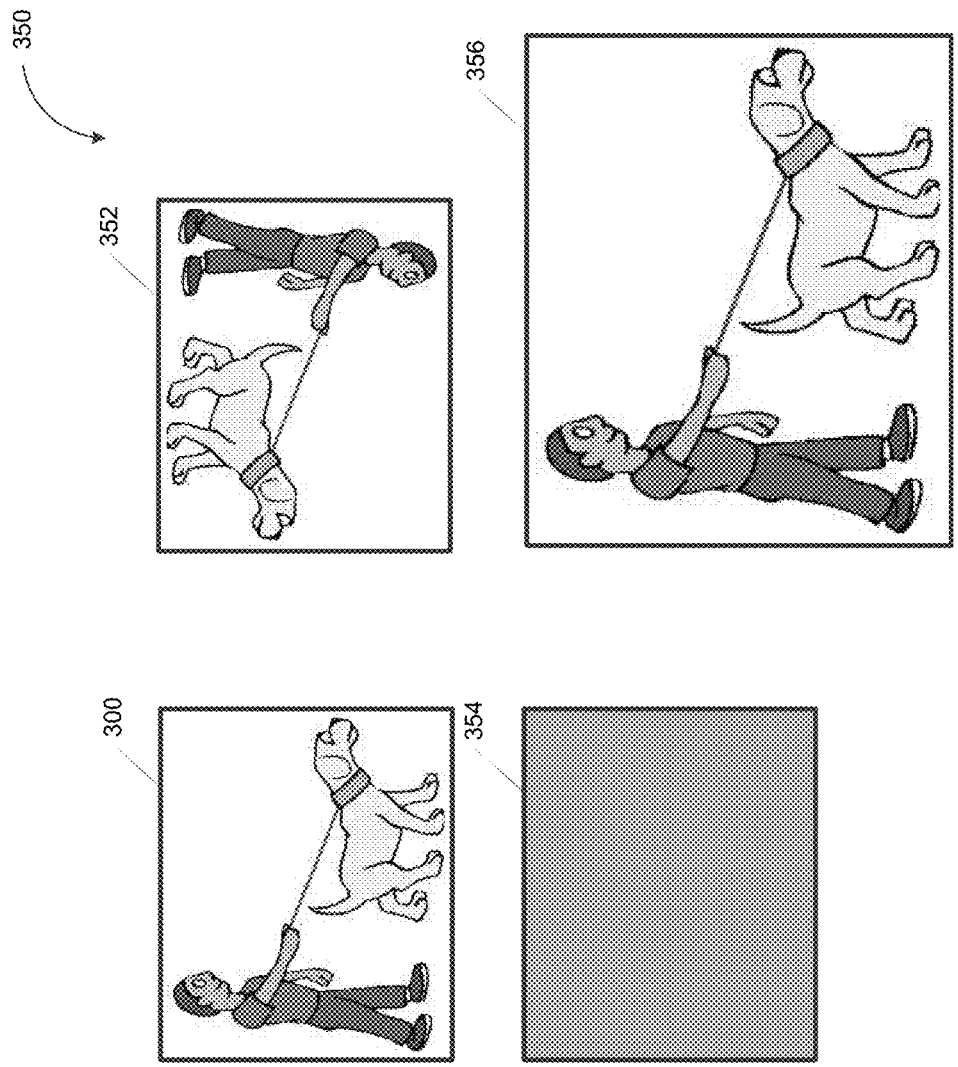

WEIGHT INITIALIZATION FOR MACHINE LEARNING MODELS

FIELD

The present disclosure generally relates to machine learning and, more specifically, to the initializing of weights associated with a machine learning model.

BACKGROUND

Machine learning models may be trained to perform a variety of cognitive tasks including, for example, image classification and speech recognition. A convolutional neural network is a type of machine learning model that may be trained using training data that has been labeled with the correct classifications (e.g., ground truth) for the training data. Training the convolutional neural network may include tuning the convolutional neural network (e.g., adjusting weights and/or biases) to minimize a cost function, which may represent the errors that are present in the classifications of the training data relative to the correct classifications for the training data.

SUMMARY

Methods, systems, and articles of manufacture, including computer program products, are provided for determining initial weights for a machine learning model. In some implementations of the current subject matter, there is provided a system. The system can include at least one processor and at least one memory. The at least one memory can include program code that provides operations when executed by the at least one processor. The operations may include: processing an image set with a convolutional neural network configured to detect, in the image set, a first feature and a second feature; determining a respective effectiveness of the first feature and the second feature in enabling the convolutional neural network to classify images in the image set; determining, based at least on the respective effectiveness of the first feature and the second feature, a first initial weight for the first feature and a second initial weight for the second feature; and initializing the convolutional neural network for training, the initialization of the convolutional neural network comprising configuring the convolutional neural network to apply the first initial weight and the second initial weight.

In some variations, one or more of the features disclosed herein including the following features can optionally be included in any feasible combination. The first feature and the second feature may be identified by at least: generating, based at least on an image depicting a plurality of objects, a cropped image depicting only one of the plurality of objects; and identifying, in the cropped image, the first feature and/or the second feature. A third feature may be excluded from a feature set comprising the first feature and the second feature. The third feature may be excluded based at least on the third feature being similar and/or identical to at least one of the first feature and the second feature.

In some variations, the effectiveness of the first feature may correspond to a first quantity of images from the image set that the convolutional neural network is able to classify based on the presence of the first feature, and the effectiveness of the second feature may correspond to a second quantity of images from the image set that the convolutional neural network is able to classify based on the presence of the second feature. The first initial weight associated with the first feature may be greater than the second initial weight associated with the second feature, when the first quantity is greater than the second quantity.

In some variations, an image set may be generated based at least on an image. The generating may include applying, to the image, one or more image manipulation techniques, and the image set being generated to include the image and a version of the image that has been altered by at least the applying of the one or more image manipulation techniques. The one or more image manipulation technique may include scaling the image, rotating the image, burning the image, dodging the image, blurring the image, and/or sharpening the image.

In some variations, an initialized convolutional neural network may be trained based at least on training data. The initialized convolutional neural network may be configured to process the training data by at least applying, to the training data, the first initial weight and the second initial weight. The training data may be processed repeatedly until the convolutional neural network achieves convergence. The convolutional neural network may achieve convergence when an error function associated with the convolutional neural network stops decreasing. A trained convolutional neural network may be validated. The validating may include processing, with the trained convolutional neural network, validation data. The validation data may include data not included in the training data used to train the convolutional neural network. The trained convolutional neural network may be validated when an error present in the classification of the validation data does not exceed a threshold value.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A depicts an initialization image, in accordance with some example embodiments;

FIG. 3B depicts a first cropped image and a second cropped image, in accordance with some example embodiments;

FIG. 3C depicts a feature set, in accordance with some example embodiments;

FIG. 3D depicts an augmented initialization image set, in accordance with some example embodiments;

Figure 1:
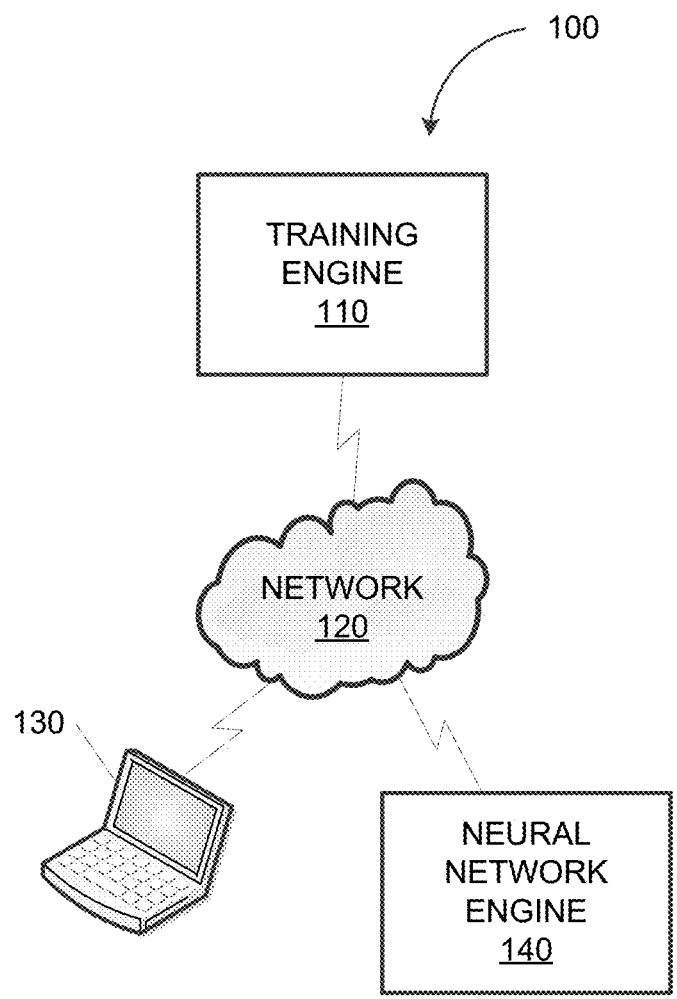
FIG. 1 depicts a network diagram illustrating a network environment, in accordance with some example embodiments.

Like labels are used to refer to same or similar items in the drawings.

DETAILED DESCRIPTION

A machine learning model, such as a convolutional neural network, may be trained by processing training data with the machine learning model. Specifically, the machine learning model may be trained by repeatedly processing the training data until the machine learning model achieves convergence, which typically occurs when the cost function or error function associated with the machine learning model is at a minima (e.g., stops decreasing). However, conventional techniques for initializing the machine learning model prior to training may require significant resources. In some instances, a machine learning model that is initialized in a conventional manner may not be able to converge at all.

In some example embodiments, a convolutional neural network may be configured to generate classifications by at least applying a plurality of weights to the training data, which may include data that has been labeled with the correct classifications (e.g., ground truths). Errors that are present in the classifications made by the convolutional neural network (e.g., relative to the labels associated with the training data) may be backpropagated through the convolutional neural network and subsequently minimized by adjusting the weights that are applied by the convolutional neural network in classifying the training data. This processing, error backpropagation, and error minimization may form an epoch and may be repeated (e.g., on the same training data) until the convolutional neural network achieves convergence (e.g., error function reaches a minima). The ability of the convolutional neural network to achieve convergence as well as the number of epochs required to achieve convergence may generally depend on the initial weights associated with the convolutional neural network. But conventional weight initialization techniques, such as randomized weight initialization, may not always enable the convolutional neural network to achieve convergence and/or may require a large number of epochs to achieve convergence.

In some example embodiments, the initial weights for a convolutional neural network may be determined by at least determining the effectiveness of various features in enabling the convolutional neural network to classify one or more images. Each feature that is present in an image may be associated with a particular weight. Meanwhile, the convolutional neural network may classify an image based on the presence and/or absence of the features, which may be detected by applying these weights to the image. A feature's effectiveness in enabling the convolutional neural network to classify images may correspond to a quantity (e.g., percentage) of images that the convolutional neural network is able to classify when the feature is present in the images. According to some example embodiments, the initial weights for the convolutional neural network may be set to reflect the effectiveness of the corresponding features being detected by application of the weights. For example, more effective features that enable the convolutional neural network to classify more images may be associated with larger initial weights while less effective features that enable the convolutional neural network to classify fewer images may be associated with smaller initial weights. Subsequent training of the convolutional neural network may include adjusting these initial weights to at least minimize the errors present in the classifications made by the convolutional neural network. It should be appreciated that setting the initial weights for the convolutional neural network as such may enable the convolutional neural network to achieve convergence and/or achieve convergence through a fewer number of training epochs.

To further illustrate, a convolutional neural network may apply one set of weights (e.g., weight matrix) to detect an eye and another set of weights (e.g., weight matrix) to detect a tail. The presence of a tail in an image may enable the convolutional neural network to differentiate between an image of a human and an image of a dog. By contrast, the presence of an eye in image may not enable the convolutional neural network to differentiate between the image of the human and the image of the dog. Thus, a tail may be a more effective feature than an eye because the convolutional neural network may be able to correctly classify a larger quantity (e.g., percentage) of images based on the presence of a tail than based on the presence of an eye. According to some example embodiments, the initial weights for the convolutional neural network may be set to correspond to the respective effectiveness of a tail and an eye in enabling the convolutional neural network to classify one or more images. Specifically, the initial weights for the convolutional neural network may be set such that the weight applied to detect a tail is higher than the weight applied to detect an eye.

In some example embodiments, determining the initial weights for a convolutional neural network may include generating a feature set based on initialization data, which may include a plurality of initialization images. For instance, generating the feature set may include extracting, from the plurality of initialization images, one or more crop images. A crop image may include a single object (e.g., human, dog) appearing in the plurality of initialization images. These crop images may be further processed by least converting the crop images to a single color channel (e.g., greyscale) and/or normalizing the pixel values of the crop images (e.g., to a certain range such as [0, 1]). Meanwhile, the feature set may be generated to include features (e.g., eye, tail) that are present in the crop images. Moreover, this feature set may be refined by at least removing identical features and/or similar features (e.g., features that are different by less than a threshold amount). According to some example embodiments, the initial weights for the convolutional neural network may be set to correspond to the respective effectiveness of the features in this feature set.

In some example embodiments, determining the initial weights for a convolutional neural network may include generating an augmented initialization image set. For example, generating the augmented initialization image set may include applying, to the plurality of original initialization images, one or more image manipulation techniques including, for example, scaling, rotation, blurring, sharpening, burning (e.g., darkening), and/or dodging (e.g., lightening). According to some example embodiments, the respective effectiveness of the features in the feature set may be determined by at least processing this augmented initialization image set with the convolutional neural network. The effectiveness of a feature from the feature set may correspond to a quantity (e.g., percentage) of images in the augmented initialization image set the convolutional neural network is able to classify based on the presence and/or absence of the feature.

FIG. 1 depicts a network diagram illustrating a network environment 100, in accordance with some example embodiments. Referring to FIG. 1, a training engine 110 may be communicatively coupled, via a wired and/or wireless network 120, to client device 130 and/or a neural network engine 140. The wired and/or wireless network 120 can be a wide area network (WAN), a local area network (LAN), and/or the Internet.

In some example embodiments, the neural network engine 140 may be configured to implement one or more machine learning models including, for example, a convolutional neural network. As such, the neural network engine 140 may be trained to serve as, for example, an image classifier. According to some example embodiments, the training engine 110 may be configured to determine the initial weights for the neural network engine 140 (e.g., prior to training the neural network engine 140). Thus, the training engine 110 may be configured to generate, based on a plurality of initialization images, a feature set and an augmented initialization image set. The neural network engine 140 may process the augmented initialization image set by at least applying, to each image in the augmented initialization image set, the weights (e.g., weight matrices) for detecting the features in the feature set. Meanwhile, the training engine 110 may be further configured to determine the effectiveness of the features in the feature set based at least on a result of this processing. For example, the effectiveness of a feature may correspond to a quantity (e.g., percentage) of images in the augmented initialization image set that the neural network engine 140 is able to classify based on the presence and/or absence of the feature in the images.

In some example embodiments, the client device 130 may provide a user interface for interacting with the training engine 110 and/or neural network engine 140. For example, a user may provide, via the client device 130, initialization data, training data, validation data, and/or production data. Alternately and/or additionally, the user may provide, via the client device 130, one or more configurations for the neural network engine 140 including, for example, hyper parameters such as a stride size that is used by the neural network engine 140 when applying each weight. The user may further receive, via the client device 130, outputs from the neural network engine 140 including, for example, classifications for the initialization data, training data, validation data, and/or production data.

In some example embodiments, the functionalities of the training engine 110 and/or the neural network engine 140 may be accessed (e.g., by the client device 130) as a remote service (e.g., a cloud application) via the network 120. For instance, the training engine 110 and/or the neural network engine 140 may be deployed at one or more separate remote platforms. Alternately and/or additionally, the training engine 110 and/or the neural network engine 140 may be deployed (e.g., at the client device 130) as computer software and/or dedicated circuitry (e.g., application specific integrated circuits (ASICs)).

Figure 2:
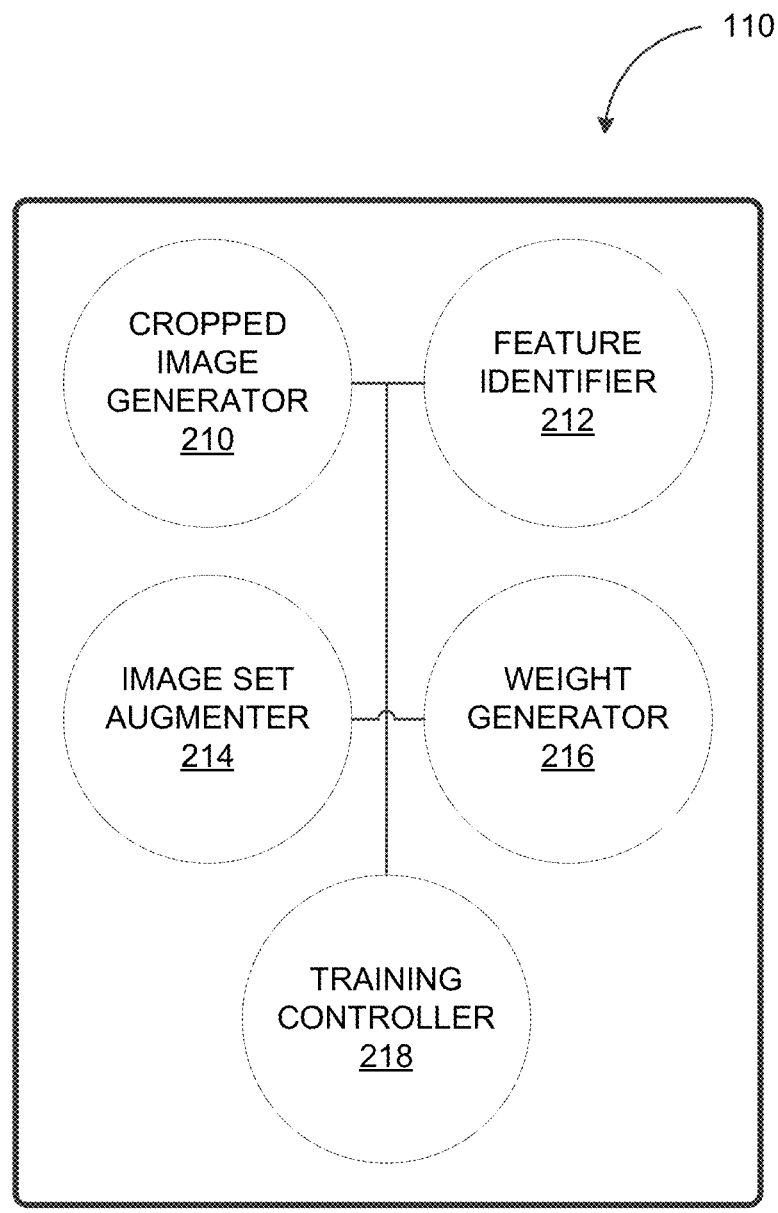
FIG. 2 depicts a block diagram illustrating a training engine, in accordance with some example embodiments.

FIG. 2 depicts a block diagram illustrating the training engine 110, in accordance with some example embodiments. Referring to FIGS. 1-2, the training engine 110 may include a cropped image generator 210, a feature identifier 212, an image set augmenter 214, a weight generator 216, and a training controller 218. It should be appreciated that the training engine 110 may include additional and/or different modules.

As noted above, the training engine 110 may be configured to determine the initial weights for a convolutional neural network (e.g., implemented by the neural network engine 140). In some example embodiments, in order to determine the initial weights for the convolutional neural network, the cropped image generator 210 may extract, from a plurality of initialization images, one or more cropped images that depict only a single object. FIG. 3A depicts an initialization image 300, in accordance with some example embodiments. As shown in FIG. 3A, the initialization image 300 may depict a first object 312 (e.g., a human) and a second object 314 (e.g., a dog). The cropped image generator 210 may extract, from the initialization image 300, a first cropped image 322, which depicts only the first object 312 (e.g., the human). The cropped image generator 210 may further extract, from the initialization image 300, a second cropped image 324, which depicts only the second object 314. FIG. 3B depicts the first cropped image 322 and the second cropped image 324, in accordance with some example embodiments.

According to some example embodiments, when the initialization image 300 is a colored image having multiple color channels (e.g., red, green, and blue), the cropped image generator 210 may be further configured to convert the first cropped image 322 and/or the second cropped image 324 to a single color channel (e.g., greyscale). Alternately and/or additionally, the cropped image generator 210 may normalize the pixel values present within the first cropped image 322 and/or the second cropped image 324. For example, the pixel values present within the first cropped image 322 and/or the second cropped image 324 may be normalized to fall within a certain range (e.g., [0, 1]).

In some example embodiments, the feature identifier 212 may be configured to identify, based at least on the cropped images (e.g., generated by the cropped image generator 210), a set of features present in the cropped images. FIG. 3C depicts a feature set 330, in accordance with some example embodiments. The feature set 330 may include various features that are present in, for example, the first cropped image 322 and/or the second cropped image 324. According to some example embodiments, the features in the feature set may have any desired and/or required size. For instance, the feature set 330 may include features that span n×n pixels in the corresponding cropped images.

As shown in FIG. 3A, the feature set 330 may include a first feature 332, a third feature 336, and a fourth feature 338. The first feature 332 may be an eye, the third feature 336 may be a tail, and the fourth feature 338 may be a shoe. In some example embodiments, to generate the feature set 330, the feature identifier 212 may remove and/or exclude similar features, which may be different from other features in the feature set 330 by less than a threshold amount (e.g., one standard deviation). For instance, the feature identifier 212 may remove and/or exclude, from the feature set 330, a second feature 334. The second feature 334 may be an eye (e.g., a dog eye) and is therefore similar to the first feature 332, which is also an eye (e.g., a human eye). Alternately and/or additionally, the feature identifier 212 may also remove and/or exclude, from the feature set 330, identical features. For example, the feature identifier 212 may remove and/or exclude, from the feature set 330, a fifth feature 340. The fifth feature 340 may be identical to the fourth feature 338 because both the fourth feature 338 and the fifth feature 340 may be the same shoe.

In some example embodiments, the image set augmenter 214 may be configured to augment the plurality of initialization images, which form the basis for the feature set 330. For instance, the image set augmenter 214 may augment the plurality of initialization images by at least applying one or more image manipulation techniques (e.g., scaling, rotation, blurring, sharpening, burning, dodging) to initialization image 300 shown in FIG. 3A. FIG. 3D depicts an augmented initialization image set 350. Referring to FIG. 3D, the augmented initialization image set 350 may include the original version of the initialization image 300. Furthermore, the augmented initialization image set 350 may include a first altered image 352, a second altered image 354, and a third altered image 356. As shown in FIG. 3D, the first altered image 352 may be a rotated version of the initialization image 300 while the second altered image 354 may be a burned (e.g., darkened) version of the initialization image 300. Meanwhile, the third altered image 356 may be an enlarged version of the initialization image 300.

In some example embodiments, the weight generator 216 may be configured to determine the initial weights for a convolutional neural network (e.g., implemented by the neural network engine 140). The initial weights for the convolutional neural network may correspond to the effectiveness of the features in the feature set 330 in enabling the convolutional neural network to classify the images in the augmented initialization image set 350. That is, the convolutional neural network may be initialized with initial weights that correspond to the effectiveness of the features in the feature set 330 (e.g., the first feature 332, the third feature 336, and/or the fourth feature 338). The effectiveness of a feature may correspond to a correlation between the presence of the feature and an ability of the convolutional neural network to correctly classify an image based on the presence of that feature.

According to some example embodiments, the weight generator 216 may be configured to process the augmented initialization image set 350 with the convolutional neural network, which may be configured to apply the weights to detect the features in the feature set 330 (e.g., the first feature 332, the third feature 336, and/or the fourth feature 338). The weight generator 216 may be further configured to determine an effectiveness of each feature in the feature set 330 based on a quantity (e.g., percentage) of images from the augmented initialization image set 350 that the convolutional neural network is able to classify when the features in the feature set 330 are present in the augmented initialization image set 350.

To illustrate, the first feature 332 may be an eye while the third feature 336 may be a tail. The presence of a tail may enable the convolutional neural network to differentiate between the first object 312 (e.g., the human) and the second object 314 (e.g., the dog) while the presence of an eye may not enable the convolutional neural network to differentiate between the first object 312 and the second object 314. As such, the third feature 336 may be a more effective feature than the first feature 332 because the presence of the third feature 336 (e.g., the tail) may enable the convolutional neural network to correctly classify a larger quantity (e.g., percentage) of the images from the initialization image set 350. For instance, the convolutional neural network may be able to classify 80% of the initialization image set 350 when a tail is determined to be present in the images while the convolutional neural network may only be able to classify 40% of the initialization image 350 when an eye is determined to be present in the images. Thus, according to some example embodiments, the weight generator 216 may assign, to the third feature 336, a larger initial weight than to the first feature 332.

In some example embodiments, the training controller 218 may be configured to conduct the training of a convolutional neural network (e.g., implemented by the neural network engine 140). For example, the training controller 218 may initialize the convolutional neural network by at least applying the initial weights determined by the weight generator 216. The training controller 218 may train the convolutional neural network by processing training data with the convolutional neural network. According to some example embodiments, the same set of training data may be processed repeatedly (e.g., over multiple epochs) until the convolutional neural network achieves convergence. Here, the training controller 218 may further validate the resulting trained convolutional neural network by at least processing validation data with the trained convolutional neural network. The validation data may include, for example, labeled images that are not part of the training data that was used to train the convolutional neural network. The training controller 218 may successfully validate the train convolutional neural network, when the error present in the classification of the validation data does not exceed a threshold value.

Figure 4A:
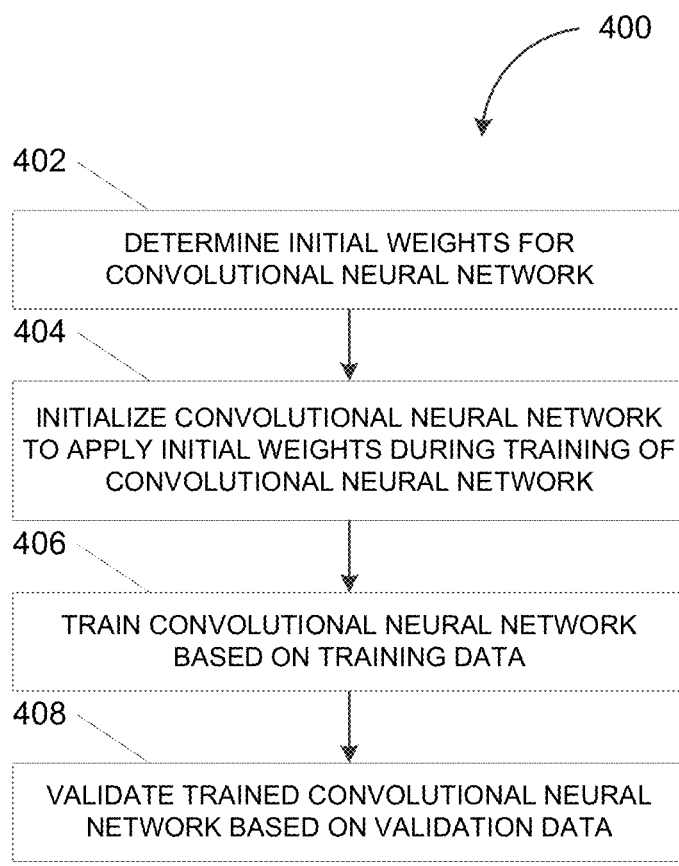
FIG. 4A depicts a flowchart illustrating a process for training a convolutional neural network, in accordance with some example embodiments.

FIG. 4A depicts a flowchart illustrating a process 400 for training a convolutional neural network, in accordance with some example embodiments. Referring to FIGS. 1-4A, the process 400 may be performed by the training engine 110.

The training engine 110 may determine a plurality of initial weights for a convolutional neural network (402). For example, the training engine 110 (e.g., the weight generator 112) may determine the initial weights that are applied by a convolutional neural network (e.g., implemented by the neural network engine 140) to detect one or more features (e.g., in the feature set 330). In some example embodiments, these initial weights may correspond to the effectiveness of each feature in enabling the convolutional neural network to classify one or more images. For instance, the initial weight for the third feature 336 may correspond to a quantity (e.g., percentage) of images (e.g., the augmented initialization image set 350) the convolutional neural network is able to classify based on the presence of the third feature 336 (e.g., tail). The training engine 110 may assign, to the third feature 336, a higher initial weight than the first feature 332, when the convolutional neural network is able to classify a larger quantity of images based on the presence of the third feature 336 (e.g., tail) than based on the presence of the first feature 332 (e.g., eye).

The training engine 110 may initialize the convolutional neural network to at least apply the initial weights during training of the convolutional neural network (404). For example, the training engine 110 (e.g., the training controller 218) may initialize the convolutional neural network to apply the initial weights assigned to the features in the feature set 330 at operation 402. As such, during subsequent training, the convolutional neural network may process training data by at least applying the initial weights to the training data.

The training engine 110 may train, based at least on training data, the convolutional neural network (406). For instance, the training engine 110 (e.g., the training controller 218) may train the convolutional neural network by at least processing training data with the convolutional neural network. The training of the convolutional neural network may include processing the same training data repeatedly (e.g., over multiple epochs) until the convolutional neural network achieves convergence. In some example embodiments, the training engine 110 may determine that the convolutional neural network has achieved convergence when the cost function or error function associated with the convolutional neural network reaches a minima, which may occur when the cost function or the error function stops decreasing.

The training engine 110 can validate, based at least on validation data, the trained convolutional neural network (408). For example, the training engine 110 (e.g., the training controller 218) may validate that the convolutional neural network is able to correctly classify one or more images, subsequent to the training performed at operation 406. To do so, the training engine 110 may process validation data with the trained convolutional neural network. The validation data may include one or more labeled images, which may not be a part of the training data used to train the convolutional neural network. In some example embodiments, the convolutional neural network may be successfully validated when the error present in the classification of the validation data does not exceed a threshold value.

Figure 4B:
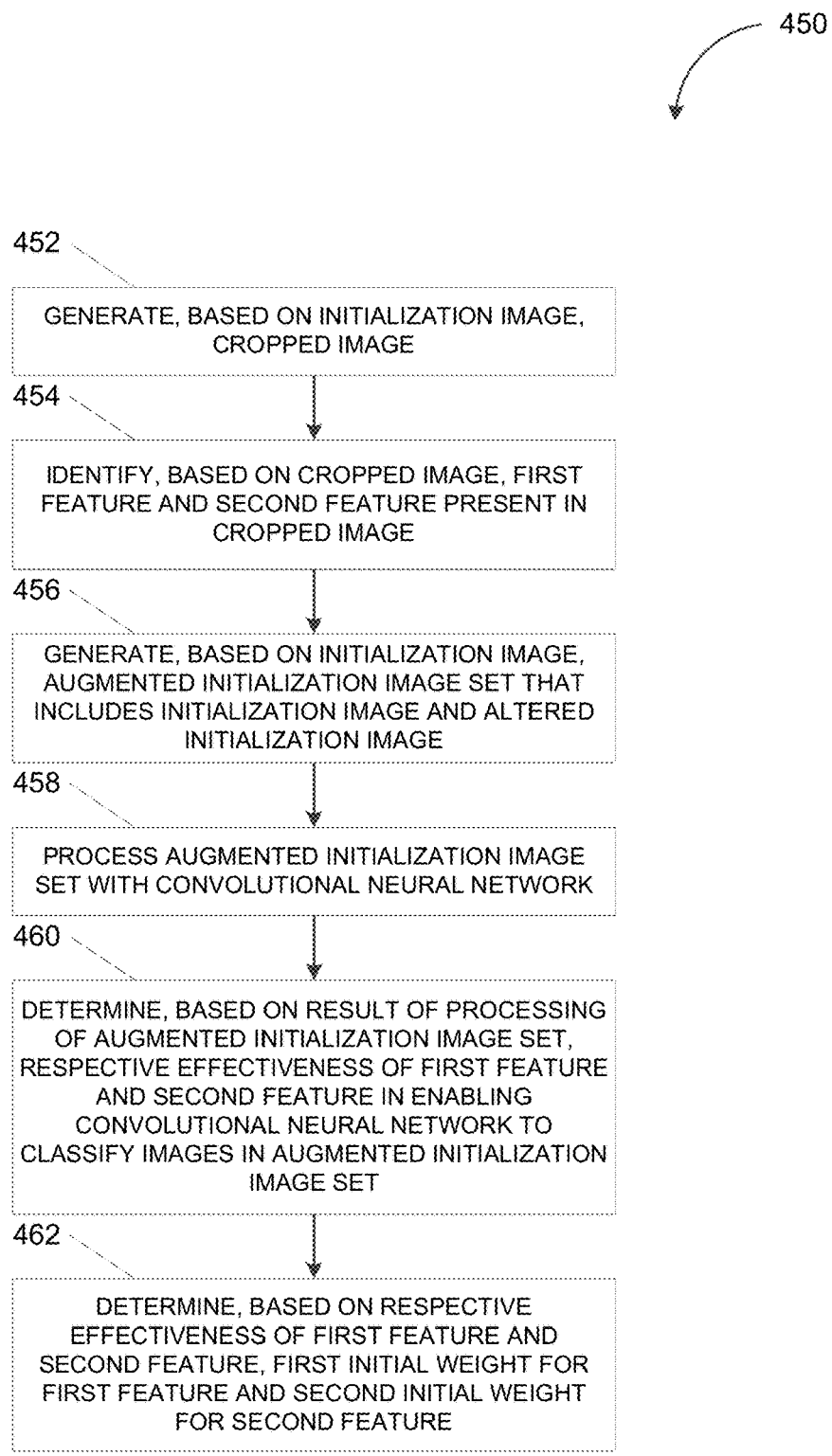
FIG. 4B depicts a flowchart illustrating a process for determining initial weights for a convolutional neural network, in accordance with some example embodiments.

FIG. 4B depicts a flowchart illustrating a process 450 for determining the initial weights for a convolutional neural network, in accordance with some example embodiments. Referring to FIGS. 1-2, 3A-D, and 4A-B, the process 450 may be performed by the training engine 110 and may implement operation 402 of the process 400.

The training engine 110 may generate, based at least on an initialization image, a cropped image (452). For example, the training engine 110 (e.g., the cropped image generator 212) may generate, from the initialization image 300, the first cropped image 322 and the second cropped image 324. The first cropped image 322 and the second cropped image 324 may each depict only a single object from the initialization image 300. For instance, the first cropped image 322 may include the first object 312 (e.g., the human) while the second cropped image 324 may include the second object 314 (e.g., the dog).

The training engine 110 may identify, based at least on the cropped image, a first feature and a second feature present in the cropped image (454). For instance, the training engine 110 (e.g., the feature identifier 214) may generate the feature set 330, which may include features present in the first cropped image 322 and/or the second cropped image 324. The feature set 330 may include, for example, the first feature 332 (e.g., an eye), the third feature 336 (e.g., a tail), and the fourth feature 338 (e.g., a foot). In some example embodiments, generating the feature set 330 may include removing and/or excluding identical features and/or similar features (e.g., that are not different by more than a threshold amount). Thus, the second feature 334 may be removed and/or excluded from the feature set 330 because the second feature 334 is similar to the first feature 332. Likewise, the fifth feature 340 may be removed and/or excluded from the feature set 330 because the fifth feature 340 is identical to the fourth feature 338.

The training engine 110 may generate, based at least on the initialization image, an augmented initialization image set that includes the initialization image and an altered initialization image (456). For example, the training engine 110 (e.g., the image set augmenter 214) may be configured to generate, based on the original version of the initialization image 300, one or more additional images that are altered versions of the original version of the initialization image 300. According to some example embodiments, the training engine 110 may apply, to the initialization image 300, one or more image manipulation techniques including, for example, scaling, rotation, blurring, sharpening, burning, and dodging. The resulting augmented initialization image set 350 may include, for example, the original version of the initialization image 300, a rotated version of the initialization image 300 (e.g., the first altered image 352), a burned version of the initialization image 300 (e.g., the second altered image 354), and/or a scaled version of the initialization image 300 (e.g., the third altered image 356).

The training engine 110 may process the augmented initialization image set with the convolutional neural network (458). For example, the training engine 110 (e.g., the weight generator 216) may process the augmented initialization image set 350 with the convolutional neural network (e.g., implemented by the neural network engine 140).

The training engine 110 can determine, based at least on a result of the processing of the augmented initialization image set, a respective effectiveness of the first feature and the second feature in enabling the convolutional neural network to classify images in the augmented initialization image set (460). For example, the training engine 110 (e.g., the weight generator 216) may determine a quantity (e.g., percentage) of the augmented initialization image set 350 that the convolutional neural network is able to classify based on the presence of the first feature 332. The training engine 110 may also determine a quantity (e.g., percentage) of the augmented initialization image set 350 that the convolutional neural network is able to classify based on the presence of the third feature 336.

The training engine 110 can determine, based at least on the respective effectiveness of the first feature and the second feature, a first initial weight for the first feature and a second initial weight for the second feature (462). For instance, the presence of a tail in an image may enable a convolutional neural network to differentiate between the first object 312 (e.g., the human) and the second object 314 (e.g., the dog) while the presence of an eye in an image may not enable the convolutional neural network to differentiate between the first object 312 and the second object 314. As such, the convolutional neural network may be able to classify a larger quantity (e.g., percentage) of the augmented initialization image set 350 based on the presence of the third feature 336 than based on the presence of the first feature 332. Thus, according to some example embodiments, the training engine 110 may assign, to the third feature 336, a higher initial weight than to the first feature 332.

Figure 5:
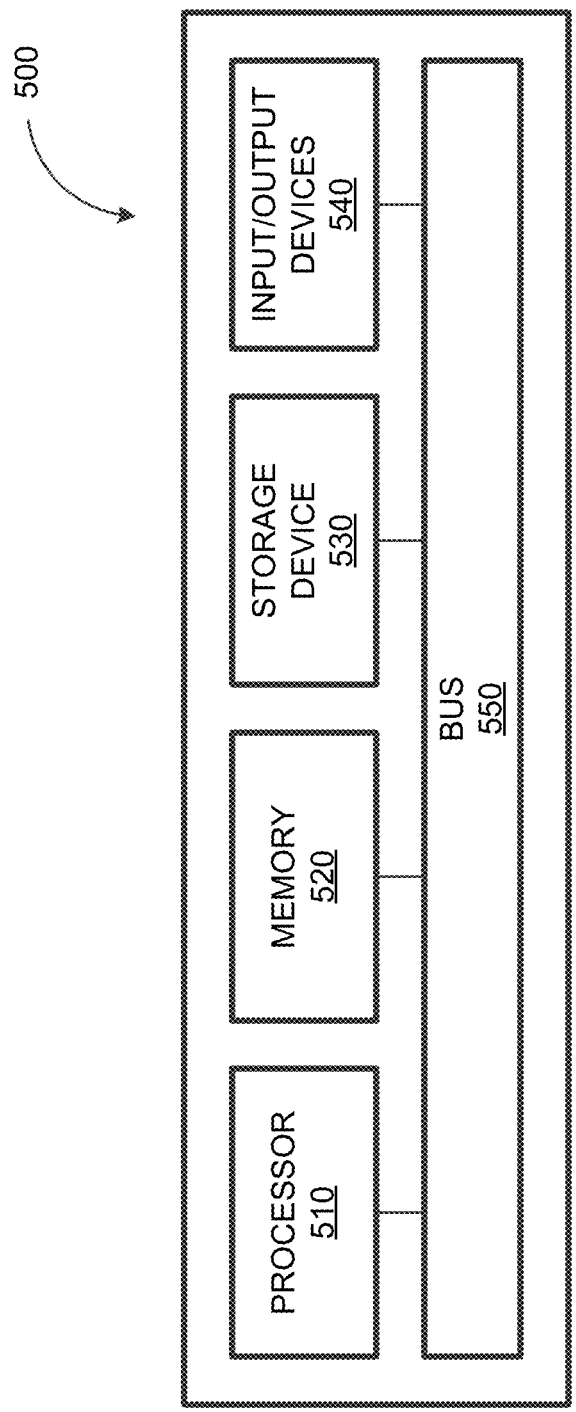
FIG. 5 depicts a block diagram illustrating a computing system, in accordance with some example embodiments.

FIG. 5 depicts a block diagram illustrating a computing system 500, in accordance with some example embodiments. Referring to FIGS. 1-2 and 5, the computing system 500 can be used to implement the training engine 110, the client device 130, the neural network engine 140, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the training engine 110, the client device 130, and/or the neural network engine 140. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:
1. A system, comprising:
at least one data processor; and
at least one memory storing instructions which, when executed by the at least one data processor, result in operations comprising:

processing an image set with a convolutional neural network configured to detect, in the image set, a first feature and a second feature;

determining a first effectiveness of the first feature and a second effective of the second feature, the first effectiveness of the first feature corresponding to a first quantity of images in the image set the convolutional neural network is able to classify based on the presence of the first feature, and the second effectiveness of the second feature corresponding to a second quantity of images in the image set the convolutional neural network is able to classify based on the presence of the second feature;

determining, based at least on the first effectiveness of the first feature and the second effectiveness of the second feature, a first initial weight for the first feature and a second initial weight for the second feature; and initializing the convolutional neural network prior to training the convolutional neural network, the initialization of the convolutional neural network comprising configuring the convolutional neural network to apply, during the training of the convolutional neural network, the first initial weight and the second initial weight.

2. The system of claim 1, further comprising:
identifying the first feature and the second feature, the identifying of the first feature and the second feature comprising:
generating, based at least on an image depicting a plurality of objects, a cropped image depicting only one of the plurality of objects; and
identifying, based at least on the cropped image, the first feature and/or the second feature.

3. The system of claim 2, further comprising:
excluding, from a feature set comprising the first feature and the second feature, a third feature, the excluding of the third feature based at least on the third feature being similar and/or identical to at least one of the first feature and the second feature.

4. The system of claim 1, wherein the first initial weight associated with the first feature is greater than the second initial weight associated with the second feature, when the first quantity is greater than the second quantity.

5. The system of claim 1, further comprising:
generating, based at least on an image, the image set, the generating comprising applying, to the image, one or more image manipulation techniques, and the image set being generated to include the image and a version of the image that has been altered by at least the applying of the one or more image manipulation techniques.

6. The system of claim 5, wherein the one or more image manipulation technique comprises scaling the image, rotating the image, burning the image, dodging the image, blurring the image, and/or sharpening the image.

7. The system of claim 1, further comprising:
training, based at least on training data, an initialized convolutional neural network, the initialized convolutional neural network being configured to process the training data by at least applying, to the training data, the first initial weight and the second initial weight.

8. The system of claim 7, wherein the training data is processed repeatedly until the convolutional neural network achieves convergence, and wherein the convolutional neural network achieves convergence when an error function associated with the convolutional neural network stops decreasing.

9. The system of claim 7, further comprising:
validating a trained convolutional neural network, the validating comprising processing, with the trained convolutional neural network, validation data, the validation data comprising data not included in the training data used to train the convolutional neural network, and the trained convolutional neural network being validated when an error present in the classification of the validation data does not exceed a threshold value.

10. A computer-implemented method, comprising:
processing an image set with a convolutional neural network configured to detect, in the image set, a first feature and a second feature;

determining a first effectiveness of the first feature and a second effective of the second feature, the first effectiveness of the first feature corresponding to a first quantity of images in the image set the convolutional neural network is able to classify based on the presence of the first feature, and the second effectiveness of the second feature corresponding to a second quantity of images in the image set the convolutional neural network is able to classify based on the presence of the second feature;

determining, based at least on the first effectiveness of the first feature and the second effectiveness of the second feature, a first initial weight for the first feature and a second initial weight for the second feature; and initializing the convolutional neural network prior to training the convolutional neural network, the initialization of the convolutional neural network comprising configuring the convolutional neural network to apply, during the training of the convolutional neural network, the first initial weight and the second initial weight.

11. The method of claim 10, further comprising:
identifying the first feature and the second feature, the identifying of the first feature and the second feature comprising:
generating, based at least on an image depicting a plurality of objects, a cropped image depicting only one of the plurality of objects; and
identifying, based at least on the cropped image, the first feature and/or the second feature.

12. The method of claim 11, further comprising:
excluding, from a feature set comprising the first feature and the second feature, a third feature, the excluding of the third feature based at least on the third feature being similar and/or identical to at least one of the first feature and the second feature.

13. The method of claim 10, wherein the first initial weight associated with the first feature is greater than the second initial weight associated with the second feature, when the first quantity is greater than the second quantity.

14. The method of claim 10, further comprising:
generating, based at least on an image, the image set, the generating comprising applying, to the image, one or more image manipulation techniques, and the image set being generated to include the image and a version of the image that has been altered by at least the applying of the one or more image manipulation techniques.

15. The method of claim 14, wherein the one or more image manipulation technique comprises scaling the image, rotating the image, burning the image, dodging the image, blurring the image, and/or sharpening the image.

16. The method of claim 10, further comprising:
training, based at least on training data, an initialized convolutional neural network, the initialized convolutional neural network being configured to process the training data by at least applying, to the training data, the first initial weight and the second initial weight.

17. The method of claim 16, wherein the training data is processed repeatedly until the convolutional neural network achieves convergence, and wherein the convolutional neural network achieves convergence when an error function associated with the convolutional neural network stops decreasing.

18. A non-transitory computer-readable storage medium including program code, which when executed by at least one data processor, cause operations comprising:
   processing an image set with a convolutional neural network configured to detect, in the image set, a first feature and a second feature;
   determining a first effectiveness of the first feature and a second effective of the second feature, the first effectiveness of the first feature corresponding to a first quantity of images in the image set the convolutional neural network is able to classify based on the presence of the first feature, and the second effectiveness of the second feature corresponding to a second quantity of images in the image set the convolutional neural network is able to classify based on the presence of the second feature;
   determining, based at least on the first effectiveness of the first feature and the second effectiveness of the second feature, a first initial weight for the first feature and a second initial weight for the second feature; and
   initializing the convolutional neural network prior to training the convolutional neural network, the initialization of the convolutional neural network comprising configuring the convolutional neural network to apply, during the training of the convolutional neural network, the first initial weight and the second initial weight.

* * * * *